United States Patent [19]
Kanno et al.

[11] Patent Number: 5,909,343
[45] Date of Patent: Jun. 1, 1999

[54] MAGNETIC HEAD AND METHOD FOR PRODUCING THE SAME

[75] Inventors: Kyu Kanno; Kumi Takahashi; Toshinobu Watanabe; Shinji Takahashi; Tadashi Saito; Seiichi Ogata; Yoshito Ikeda; Katsuya Tanba, all of Miyagi, Japan

[73] Assignee: Sony Corporation, Tokyo, Japan

[21] Appl. No.: 08/783,210

[22] Filed: Jan. 14, 1997

Related U.S. Application Data

[63] Continuation of application No. 08/392,226, Feb. 22, 1995, abandoned.

[30] Foreign Application Priority Data

Feb. 24, 1994 [JP] Japan ..................................... 6-051232

[51] Int. Cl.⁶ ....................................................... G11B 5/56
[52] U.S. Cl. .............................................................. 360/109
[58] Field of Search ..................................... 360/104, 107, 360/109; 29/603

[56] References Cited

U.S. PATENT DOCUMENTS

| | | | |
|---|---|---|---|
| 4,497,005 | 1/1985 | Heinz | 360/109 |
| 4,897,745 | 1/1990 | Binder-Kriegelstein | 360/109 |
| 4,905,111 | 2/1990 | Tuma et al. | 360/126 |
| 5,050,024 | 9/1991 | Nanjyo | 360/104 |
| 5,130,875 | 7/1992 | Ono et al. | 360/107 |
| 5,159,510 | 10/1992 | Saito | 360/109 |
| 5,223,997 | 6/1993 | Uemura et al. | 360/103 |
| 5,303,108 | 4/1994 | Higashionji et al. | 360/107 X |
| 5,453,892 | 9/1995 | Hasegawa et al. | 360/107 |

FOREIGN PATENT DOCUMENTS 58-29115  2/1983  Japan .

Primary Examiner—William R. Korzuch
Attorney, Agent, or Firm—Hill & Simpson

[57] ABSTRACT

A magnetic head reduces a slant of a magnetic head chip in comparison with a conventional case. The magnetic head is produced by a manufacturing method. A ridge on a back surface side of a magnetic chip is brought into contact with a chip attachment surface of a chip attachment base. A height of the magnetic head chip is adjusted by using the ridge as a fulcrum.

4 Claims, 7 Drawing Sheets

OVERWRITTEN PORTION

FIG. 16
(PRIOR ART)
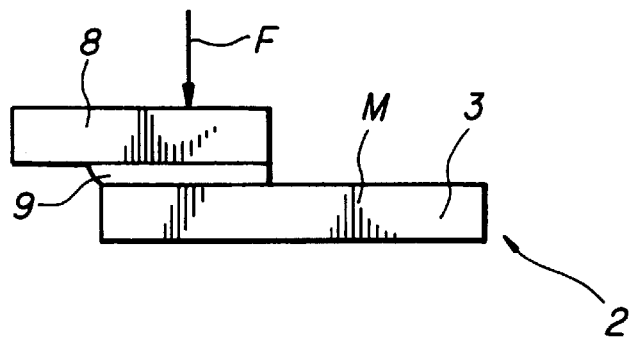
FIG. 17
(PRIOR ART)
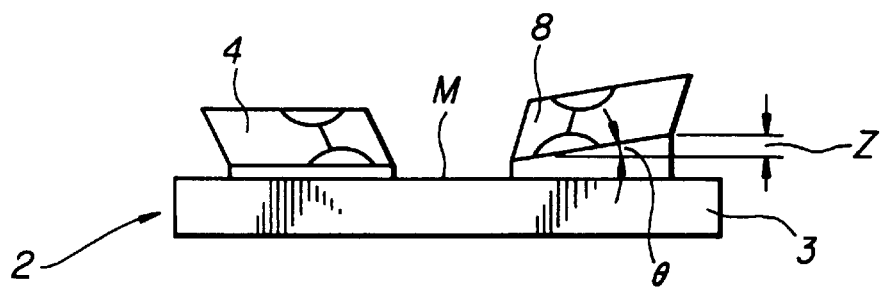
FIG. 18
(PRIOR ART)
Tw=10μm, RECORDING W.L.=0.5μm
| θ [′] | AZIMUTH LOSS [dB] |
|---|---|
| 0.1 | 0.0 |
| 0.2 | 0.1 |
| 0.3 | 0.2 |
| 0.4 | 0.3 |
| 0.5 | 0.4 |
| 0.6 | 0.6 |
| 0.7 | 0.9 |
| 0.8 | 1.1 |
| 0.9 | 1.5 |
| 1.0 | 1.8 |

MAGNETIC HEAD AND METHOD FOR PRODUCING THE SAME

This is a continuation of application Ser. No. 08/392,226, filed Feb. 22, 1995, now abandoned.

BACKGROUND OF THE INVENTION

The present invention relates to a magnetic head which is applied to a magnetic recording/playback apparatus such as a video tape recorder or the like, and a method for producing the magnetic head.

In a conventional magnetic recording/playback apparatus such as a video tape recorder or the like, recording tracks are formed by using a double azimuth head so that an video image signal or the like may be recorded at a high density.

More specifically, referring to FIG. 9, in such a magnetic recording/playback apparatus, guard bands are omitted, and recording tracks TA and TB having a positive azimuth angle and a negative azimuth angle are obliquely formed on a magnetic tape 1 in order, so that an azimuth loss may be effectively utilized upon the playback mode to thereby suppress the generation of cross-talk between the adjacent tracks.

Thus, in such a magnetic recording/playback apparatus, even if the recording tracks are formed closely, it is possible to reproduce an image signal or the like without fail.

When the recording tracks are thus formed without forming the guard bands, if the recording tracks are formed, in order, with a pair of magnetic heads being disposed at an angular interval of 180° on a rotary drum, there are some cases that a track pattern could not be correctly formed due to eccentricity of the drum or the like. In this case, as shown in FIG. 10, there is a fear that the trailing magnetic head would scan a part of a scanning locus of the leading magnetic head to generate a so-called overwritten part.

In the overwritten magnetic track TA, the signal level of the reproduced signal would be degraded corresponding to the overwritten part. The smaller the track width of each recording track (i.e., the smaller the track pitch), the more remarkable the signal level reduction will become.

For example, in the case where the recording tracks are formed at a track pitch of 10 $\mu$m, the signal level of the reproduced signal is reduced by about 1dB.

For this reason, in the double azimuth system, as shown in FIG. 11, a predetermined step is provided and the positive and negative azimuth angle magnetic heads are located close to each other on the drum, whereby a pair of the recording tracks TA and TB are almost simultaneously formed by the pair of magnetic heads.

Thus, in the case where the double azimuth head system is applied to the magnetic recording/play back apparatus, even if the rotation of the rotary drum would be eccentric, it is possible to form substantially the same track pattern for the pair of recording tracks TA and TB, so that it is effectively avoid the generation of the overwritten part.

However, in such a double azimuth head system, it should be noted that the track width of the leading recording tracks TA is determined by the step of the closely arranged magnetic heads.

For this reason, such double azimuth heads are formed by a method disclosed in, for example, Japanese Patent Application Laid-Open No. SHO 62-212914, so as to manage the step and to maintain the track width of the recording track TA in a desired range.

More specifically, as shown in FIG. 12, in a double azimuth head 2, a chip attachment base 3 is formed of a planar member, and the chip attachment base 3 is held to a desired jig tool. Under this condition, in the double azimuth head as shown in FIG. 13, a magnetic head chip 4 arranged on the leading side is sucked by a desired jig tool 5 and is held at a desired position of a chip bonding surface M which is formed on the chip attachment base 3 as a reference surface.

Next, as shown in FIG. 14, an instantaneous adhesive 7 is applied to a periphery of the magnetic head chip 4 by using an adhesive dispenser 6. As a result, the instantaneous adhesive 7 is introduced into a gap defined by the magnetic head chip 4 and the chip attachment surface M to thereby fix the magnetic head chip 4.

Furthermore, as shown in FIGS. 15 and 16, in the double azimuth head 2, after an adhesive 9 has been applied to a mount position of the magnetic head chip 8 on the trailing side, the magnetic head chip 8 is sucked and held on the trailing side in the same manner so that the magnetic head chip 8 is mounted on the adhesive 9.

In this case, in a manufacturing step of the magnetic head, the magnetic head chip 8 is pressed by a predetermined pressure F and the pressure F is increased while the physical step Tp between the magnetic head chips 4 and 8 is being monitored.

Thus, in the conventional manufacturing step, when the step Tp reaches a predetermined value, the pressure is maintained to cure the adhesive 9 so that the pair of magnetic head chips 4 and 8 are fixed to the chip attachment base 3 with a predetermined physical step.

The thus formed double azimuth head 2 is mounted on the rotary drum and the recording tracks may be, in order, formed at a predetermined pitch.

However, due to the fact that the thus formed double azimuth head chips are fixedly secured to the chip attachment base 3 via the adhesive 9, in some cases, the chips would be obliquely held relative to the chip attachment surface M in such a direction that the azimuth angle is changed due to non-uniformity or variation in an application amount, a shrinkage rate and etc. of the adhesive 9 as shown in FIG. 17. In this case, the conventional system suffers from a disadvantage that the azimuth loss would be increased when the signals recorded on the magnetic tape or the like with a correct azimuth angle is reproduced.

More specifically, in the case where the recording/playback is effected under the condition of the track width of 10 $\mu$m and the recording wavelength of 0.5 $\mu$m, if the azimuth angle is thus changed, the azimuth loss is generated as shown in FIG. 18.

In this respect, according to experiments, in the conventional double azimuth head 2, it is inevitable that a difference z between a distance from a point at which an extension line of the gap intersects with a lower end surface of the magnetic head chip 8 to the chip attachment base 3 and a distance from an end portion of the lower end surface of the magnetic chip 8 to the chip attachment base 3 is varied in the range of about 4 to 5 $\mu$m.

In the case where the difference z is 4 $\mu$m, a slant angle $\theta$ of the magnetic head chip 8 is 0.3°, and the difference z is 5 $\mu$m, the slant angle $\theta$ of the magnetic head chip 8 is 0.4°.

Thus, in the event that the video signal and so on are recorded by using the magnetic recording/playback apparatus in which the magnetic head chip 8 is slanted at $\theta=+0.3°$, and the signals of the magnetic tape on which the video signal and so on have been recorded are reproduced by another magnetic recording/playback apparatus in which the magnetic head 8 is slanted at θ=−0.3°, after all, the azimuth angle is changed by 0.6° in total and the signal level of the playback signals is reduced by −0.6 dB.

Furthermore, in the event that the video signal and so on are recorded by using the magnetic recording/playback apparatus in which the magnetic head chip 8 is slanted at θ=+0.4°, and the signals of the magnetic tape on which the video signal and so on have been recorded are reproduced by another magnetic recording/playback apparatus in which the magnetic head 8 is slanted at θ=−0.4°, the azimuth angle is changed by 0.8° in total and the signal level of the playback signals is reduced by −1.1 dB.

SUMMARY OF THE INVENTION

In view of the above-noted defects, an object of the present invention is to provide a magnetic head in which a slant of a magnetic head is reduced, and a method for producing the magnetic head.

In order to attain this and the other objects, according to the present invention, there is provided a magnetic head in which a magnetic head chip is bonded to and held by an attachment surface, the magnetic head comprising the improvement wherein the magnetic head chip faces the attachment surface and is in contact with the attachment surface along a ridge that is in parallel with a sliding surface of the magnetic head chip and is located on a back surface of the magnetic head chip to define a part of an outer contour of the magnetic head chip; and the magnetic head chip is bonded and held with a predetermined adhesive clamped in a gap defined between the attachment surface and the magnetic head chip.

Also, in order to attain this and the other objects, according to the present invention, there is provided a magnetic head in which a plurality of magnetic head chips are bonded to and held by a chip attachment base, the magnetic head comprising the improvement wherein the chip attachment base holds the plurality of magnetic head chips to a predetermined attachment surface by bonding; at least one of the magnetic head chips faces the attachment surface and in contact with the attachment surface along a ridge that is in parallel with a sliding surface of the at least one magnetic head chip and is located on a back surface of the at least one magnetic head chip to define a part of an outer contour of the at least one magnetic head chip; and the at least one magnetic head chip is bonded and held with a predetermined adhesive clamped in a gap defined between the attachment surface and the at least one magnetic head chip.

It is preferable that the plurality of magnetic head chips are composed of a pair of magnetic head chips having a positive azimuth angle and a negative azimuth angle.

It is also preferable that the pair of magnetic head chips are held with an adhesive at a step of 10 µm or less.

It is preferable that the adhesive has a shrinkage rate of 10% or less.

Also, in order to attain this and the other objects, according to the present invention, there is provided a method for producing a magnetic head in which a magnetic head chip is bonded to and held by an attachment surface, the method comprising the following steps of: interposing a predetermined adhesive between the attachment surface and the magnetic head chip; and after contacting the magnetic head chip against the attachment surface along a ridge that is in parallel with a sliding surface of the magnetic head chip and is located on a back surface of the magnetic head chip to define a part of an outer contour of the magnetic head chip, with the magnetic head chip facing the attachment surface, moving the sliding surface of the magnetic head chip by using the ridge as a fulcrum to thereby adjust a fixture position.

Also, in order to attain this and the other objects, according to the present invention, there is provided a second method for producing a magnetic head in which a plurality of magnetic head chips are bonded to and held by an attachment surface, the method comprising the following steps of: interposing a predetermined adhesive between the attachment surface and at least one of the magnetic head chips; and after contacting the at least one magnetic head chip against the attachment surface along a ridge that is in parallel with a sliding surface of the at least one magnetic head chip and is located on a back surface of the at least one magnetic head chip to define a part of an outer contour of the at least one magnetic head chip, with the at least one magnetic head chip facing the attachment surface, moving the sliding surface of the at least one magnetic head chip by using the ridge as a fulcrum to thereby adjust a fixture position.

It is preferable that the plurality of magnetic head chips are composed of a pair of magnetic head chips having a positive azimuth angle and a negative azimuth angle.

With such an arrangement, it is possible to adjust a height of the magnetic head chip by using a ridge of the magnetic chip on the back side as a fulcrum, to thereby adjust the physical step while effectively avoiding the slant relative to the attachment surface.

BRIEF DESCRIPTION OF THE DRAWINGS

In the accompanying drawings:

FIG. 16 is a side elevational view illustrating the fourth step of the conventional magnetic head manufacturing method;

FIG. 17 is a frontal view illustrating a slant of the magnetic head chip; and

FIG. 18 is a table showing a relationship between an azimuth angle and an azimuth loss.

DESCRIPTION OF THE PREFERRED EMBODIMENTS

Figure 2:
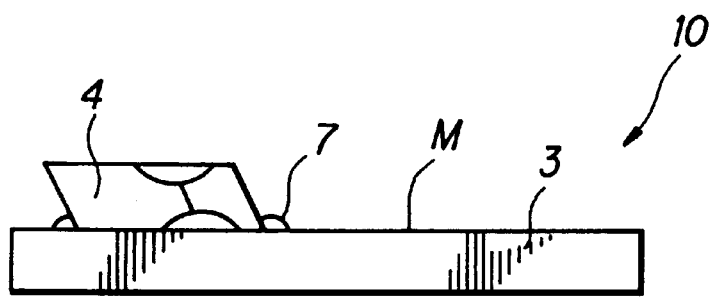
FIG. 2 is a frontal view illustrating a first step of the manufacturing method shown in FIG. 1.

One embodiment of the present invention will now be described by way of example with reference to the accompanying drawings FIG. 2 is a frontal view showing a manufacturing step for a double azimuth head according to the embodiment.

In the drawings, the same reference numerals are used to indicate like components or members shown in the conventional example and hence, the duplication of the explanation will be avoided.

Figure 3:
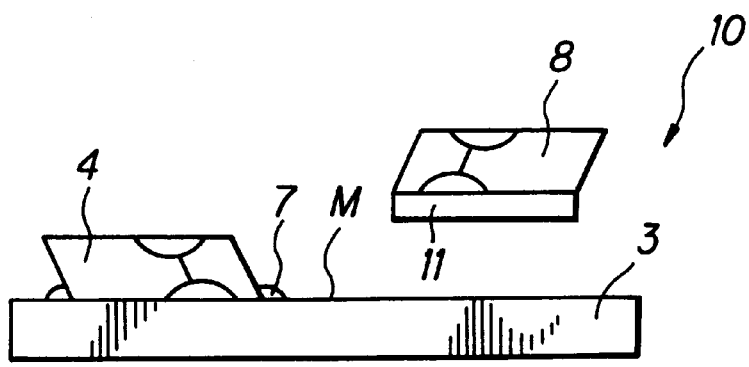
FIG. 3 is a frontal view illustrating a second step of the manufacturing method shown in FIG. 1.
Figure 4:
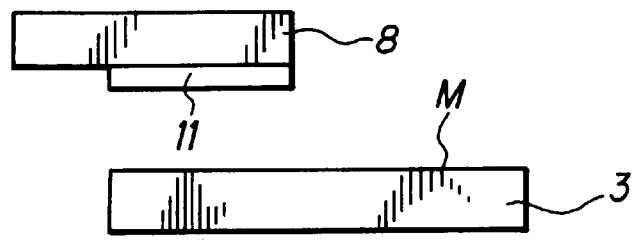
FIG. 4 is a side elevational view illustrating the second step of the manufacturing method shown in FIG. 1.

In the same manner as in the conventional case, as shown in FIGS. 3 and 4, the trailing side magnetic head chip 8 of the double azimuth head 10 is fixed to the attachment surface M of the chip attachment base 3 with the instantaneous adhesive 7 after the leading side magnetic head chip 4 has been attached to the attachment surface M of the chip attachment base 3, In the double azimuth head 10 according to this embodiment, with respect to the magnetic head chip 8 on the trailing side, an ultraviolet ray curing type adhesive 11 is applied in advance to the back surface of the magnetic head chip 8 by using an adhesive dispenser or the like.

Incidentally, in this embodiment, a cyanoacrylate system adhesive having a shrinkage rate of several tens of percents is used as the instantaneous adhesive 7, and acrylic system ultraviolet ray curing type adhesive having a shrinkage rate of 10% or less is used as the ultraviolet ray curing type adhesive 11.

Subsequently, the magnetic head chip 8 on the trailing side of the double azimuth head 10 is sucked and mounted on the chip attachment base 3 by a jig tool while a step between the magnetic head chips 4 and 8 is being monitored.

Figure 1:
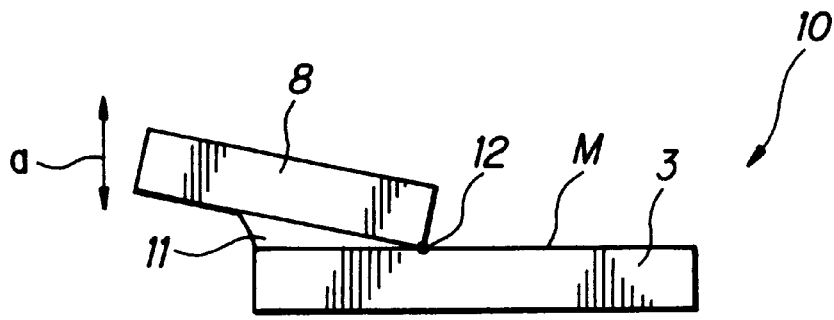
FIG. 1 is a side elevational view illustrating a manufacturing step for a magnetic head according to an embodiment of the invention.
Figure 5:
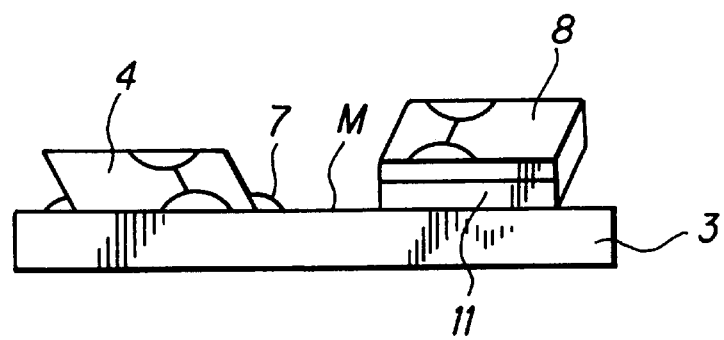
FIG. 5 is a frontal view illustrating a third step of the manufacturing method shown in FIG. 1.

In this case, in the double azimuth head 10, as shown in FIGS. 1 and 5, a ridge 12 which faces the attachment surface M and which is in parallel with a sliding surface of the magnetic head chip located on the back side of the magnetic head chip 8 while defining an outer contour of the magnetic head chip 8 (that is, the ridge of the base attachment surface of the magnetic head chip 8 for fixing the magnetic head chip 8 to the chip attachment base 3) is first pushed to and contacted with the chip attachment base 3. After that, as indicated by the arrow a in FIG. 1, the front end of the magnetic head chip 8 is moved up and down about the ridge 12 to thereby adjust the step.

In such a magnetic head chip, for example, a ferrite material is machined by cutting with high precision, and thereafter is wound by wirings, so that the ridge 12 of the base attachment surface is formed with high precision relative to the sliding surface.

Accordingly, when the front end of the magnetic head chip 8 is moved up and down about the ridge 12 as in the embodiment, it is possible to adjust the step while the lower end surface of the magnetic head chip 8 is kept in parallel with the attachment surface M of the chip attachment base 3.

After the front end of the magnetic head chip 8 has been moved up and down so that the step may be held at a predetermined value, an ultraviolet ray is projected through an optical fiber and the like to thereby cure the adhesive 11, whereby the slant of the magnetic head chip 8 relative to the attachment surface M may be reduced in the double azimuth head 10.

Furthermore, by thus setting the fulcrum 12 and adjusting the step, it is possible to restrict the movement of the magnetic head chip 8 in comparison with the conventional case, whereby it is possible to facilitate the adhesive work in comparison with the conventional case.

Figure 6:
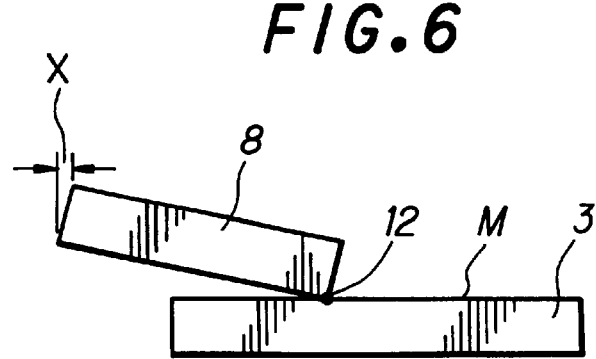
FIG. 6 is a side elevational view illustrating adjustment of a physical step.

In the case where the front end of the magnetic head chip 8 is moved about the ridge 12 of the base attachment surface to adjust the step, as shown in FIG. 6, the sliding surface of the magnetic head chip 8 is held obliquely, as a result of which there is a fear that the abutment of the magnetic head chip 8 against the magnetic tape would be degraded.

In experiments directed by the present inventors, in the magnetic head chip 8, in the case where the step was set at 5 μm, the sliding surface was slanted by 0.1°. In this case, since the width of the sliding surface (i.e., the tape contact width) was at 100 μm, after all, it was found that the distance (indicated by reference character x in FIG. 6) between the frontmost projected portion of the sliding surface and the rearmost portion thereof was 0.2 μm.

This distance of 0.2 μm may be sufficiently reduced to a satisfactory level in practical use by a step of cutting the sliding surface with a lapping tape with the double azimuth head 10 being mounted on the rotary drum.

Thus, in the double azimuth head 10, the slant of the magnetic head chip 8 could be held in a level of approximately zero upon attaching the magnetic head chip to the chip attachment base 3. The non-uniformity in azimuth angle of the magnetic head chip 8 upon fixing the magnetic head chip to the chip attachment base 3 could be set at the same level as that of the non-uniformity in azimuth angle in the magnetic chip 8 per se.

Additionally, due to the fact that the non-uniformity in azimuth angle in the magnetic head chip 8 per se was about 0.1°, in the magnetic recording/playback apparatus to which the double azimuth head 10 was applied, after all, it was found that the degradation of the signal level of the reproduced. signals could be reduced to 0.1 dB or less.

Figure 7:
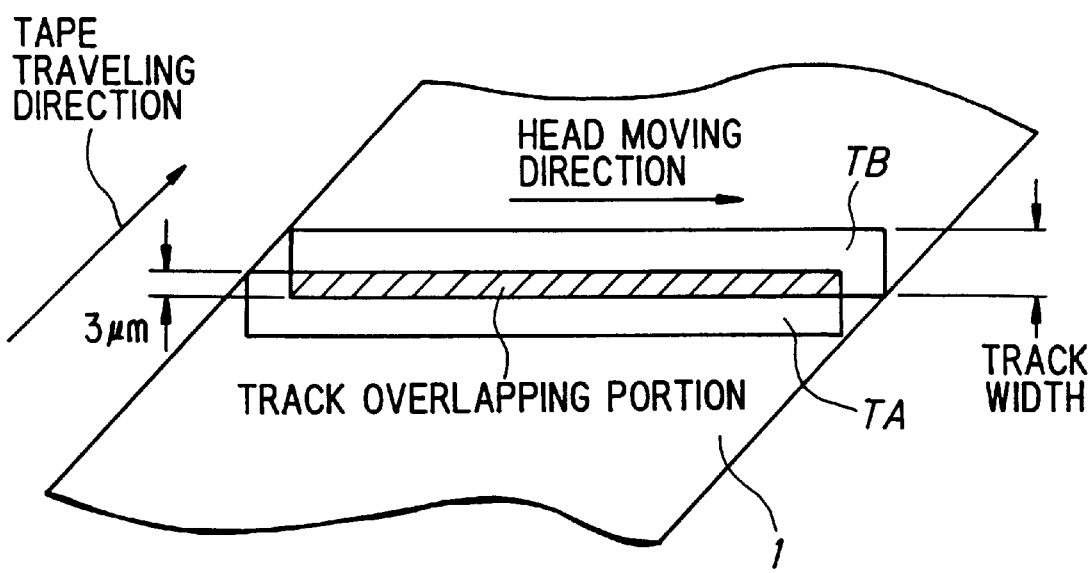
FIG. 7 is a schematic view illustrating a track overlapping portion.

By the way, even if the magnetic head chip 8 would be fixed in this manner, if the shrinkage rate of the ultraviolet ray curing adhesive would be high, the step would be small. As shown in FIG. 7, corresponding to this, an overlapping portion of the recording track TA on the leading side and the recording track TB on the trailing side (i.e., track overlapping portion) would be large.

In the case where the step was formed by using the conventional method and in the case where the ultraviolet ray curing type adhesive having the shrinkage rate of several tens of percents was used, it was found that the size of the overlapping portion was expressed by the large value of 3 μm.

Accordingly, if the ultraviolet ray curing type adhesive having the shrinkage rate of several tens of percents would be used, even if the front end of the head chip 8 would be movable about the ridge 12 of the base attachment surface to adjust the step as in the embodiment, it would be reasonable to think that the rather larger track overlapping portion would occur.

For this reason, in the embodiment, the acrylic adhesive having the shrinkage of 10% or less was used as the ultraviolet ray curing type adhesive 11 to effectively avoid the generation of the track overlapping portion.

Figure 8:
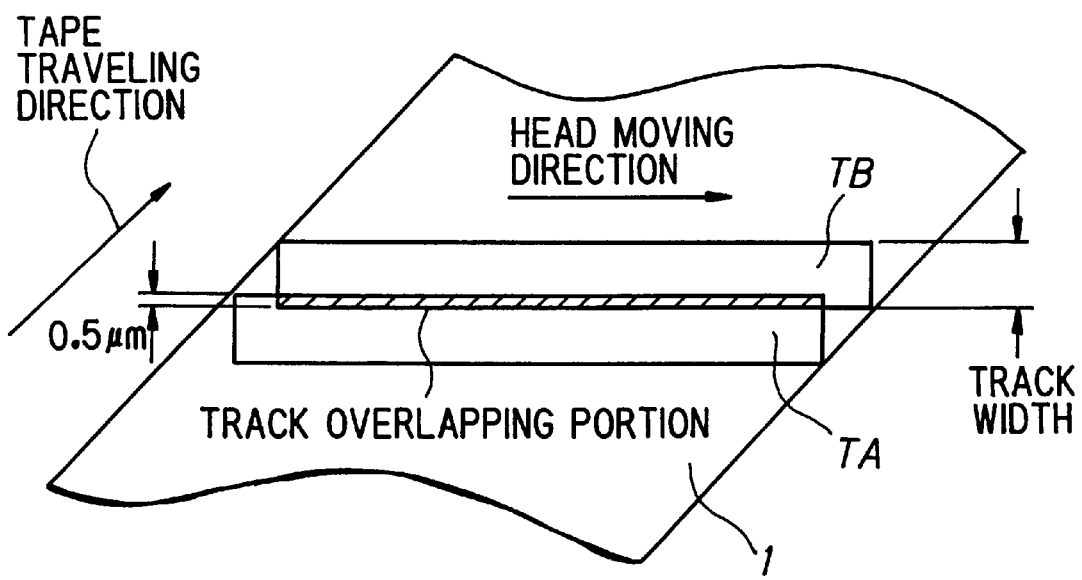
FIG. 8 is a schematic view illustrating a track overlapping portion in the case where a shrinkage rate of an adhesive is low.
Figure 9:
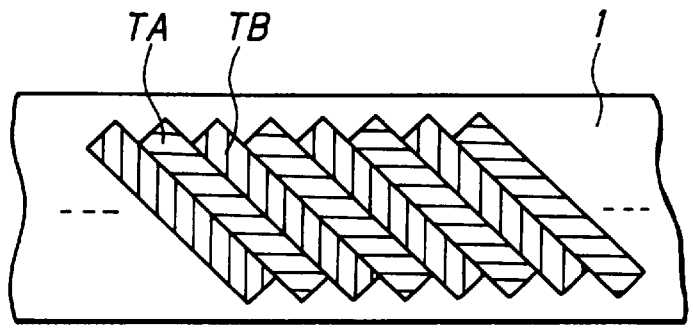
FIG. 9 is a schematic view illustrating an azimuth recording mode.
Figure 10:
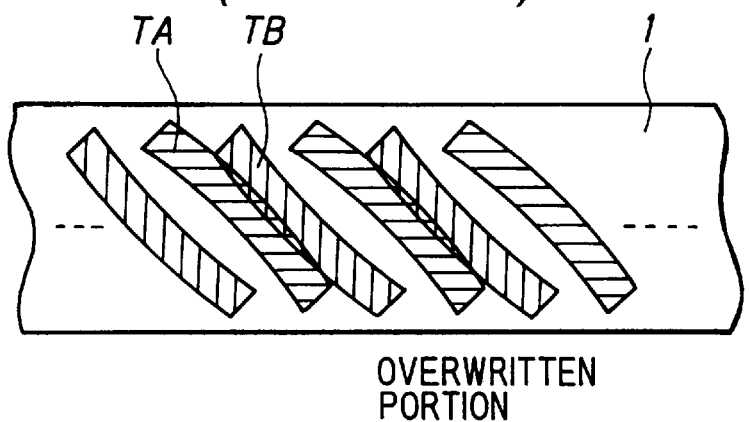
FIG. 10 is a schematic view illustrating an overlapping portion.
Figure 11:
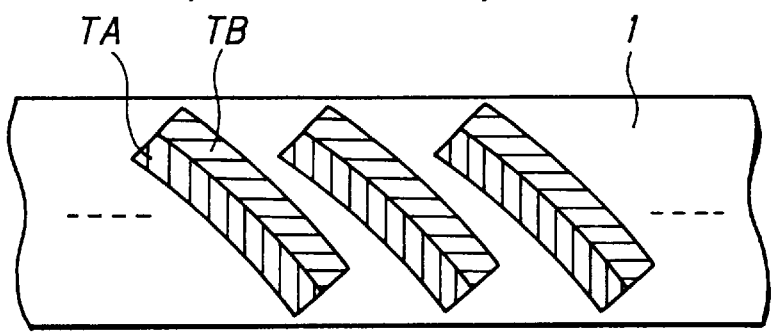
FIG. 11 is a schematic view showing a formation of recording tracks by a double azimuth head.
Figure 12:
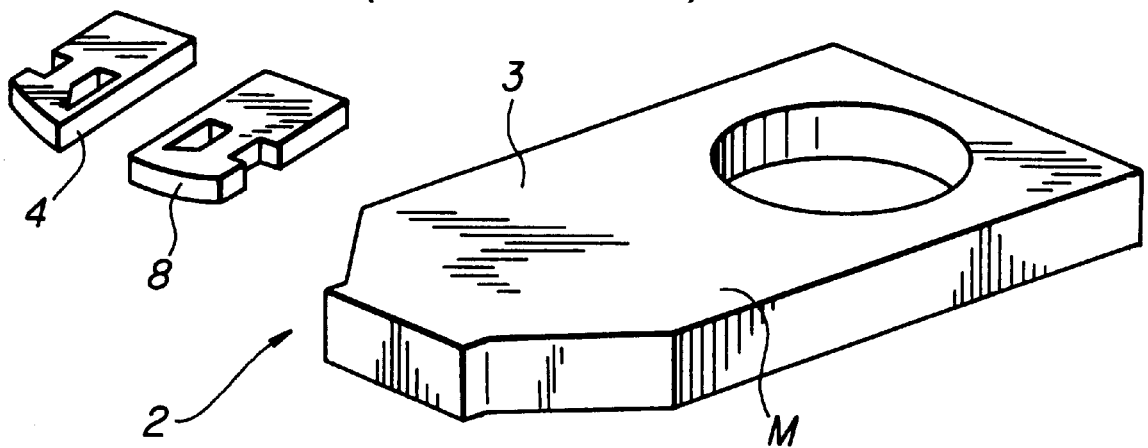
FIG. 12 is a perspective view illustrating a conventional magnetic head manufacturing step.
Figure 13:
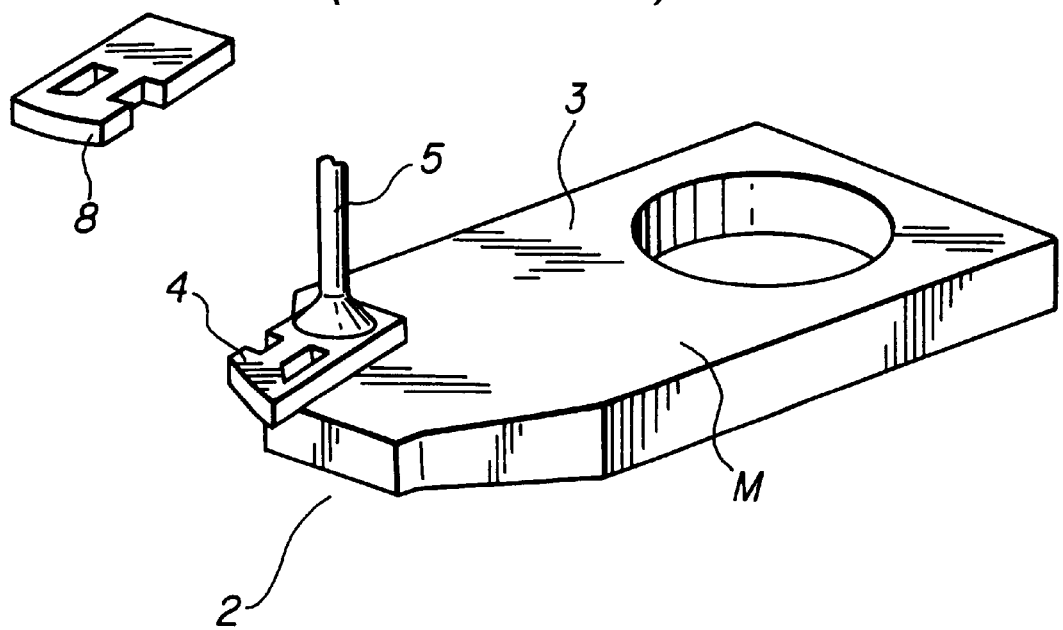
FIG. 13 is a perspective view illustrating a second step of the conventional magnetic head manufacturing method.
Figure 14:
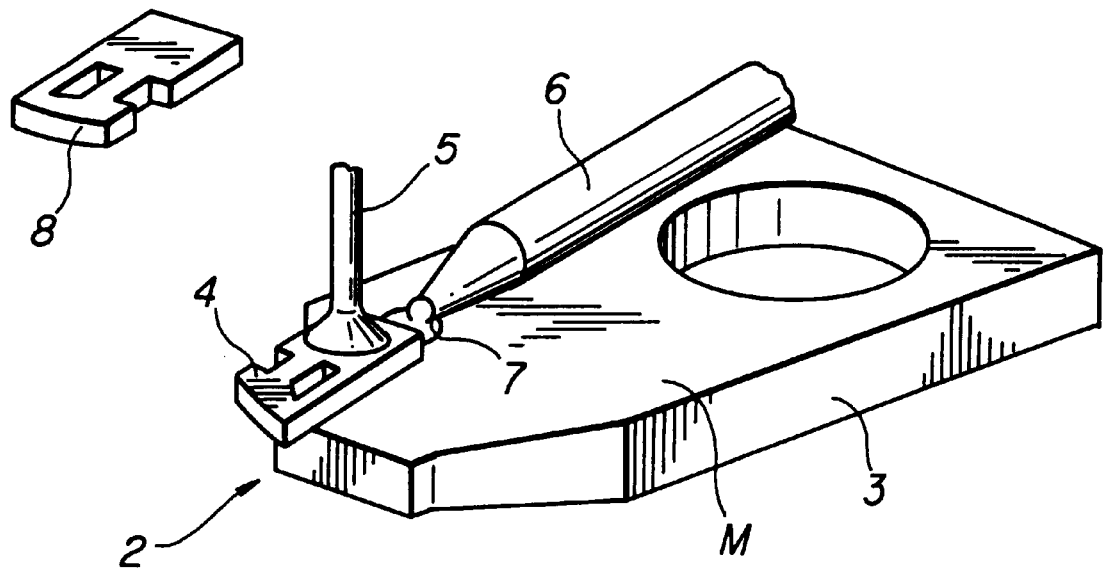
FIG. 14 is a perspective view illustrating a third step of the conventional magnetic head manufacturing method.
Figure 15:
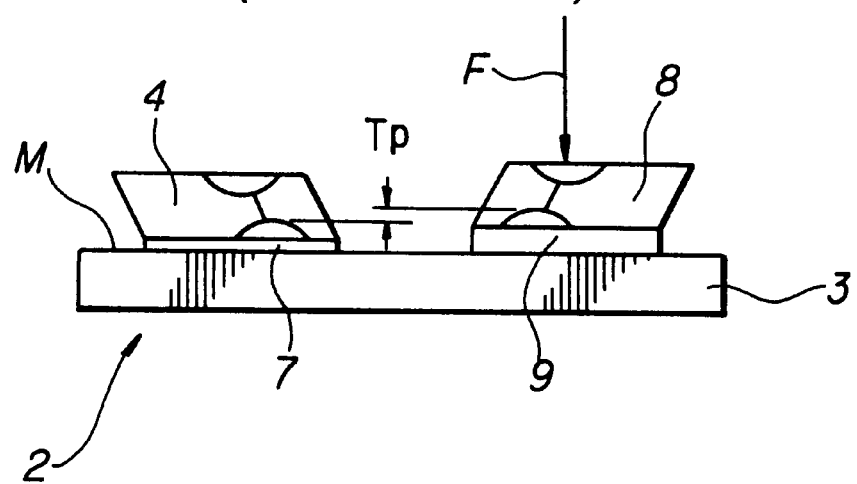
FIG. 15 is a frontal view illustrating a fourth step of the conventional magnetic head manufacturing method.

According to the experimental results, as shown in FIG. 8, when the acrylic adhesive having the shrinkage of 10% or less was used, it was found that it was possible to reduce the track overlapping portion down to 0.5 μm under the same conditions as those in FIG. 7.

Incidentally, in the embodiment, the adhesives (trade marks, LITE-TAK and DYMAX) having the shrinkage rates of 6.9% and 7.2% were used to obtain substantially the same results. Also, although, in the embodiment, the acrylic adhesives are used, it is apparent that epoxy system adhesive having a shrinkage of 5% may be used to obtain the like results.

It is therefore possible to reduce the slant of the magnetic head chip 8 relative to the attachment surface M by a simple bonding work in comparison with the conventional case.

Incidentally, in the foregoing embodiment, the ultraviolet ray curing type adhesive is applied in advance to the magnetic head chip. It is however apparent that the present invention is not limited to this case and it is possible to apply the ultraviolet ray curing type adhesive to the chip attachment base.

Furthermore, in the above-described embodiment, the trailing side magnetic head chip is bonded by using the fulcrum of the ridge, but the present invention is not limited to this case and it is possible to adjust the position of the leading side magnetic chip about its ridge as desired. Furthermore, it is possible to adjust the position about the fulcrums of both magnetic chips on the leading side and the trailing side.

Moreover, in the foregoing embodiment, the ultraviolet ray curing type adhesive is used. The present invention is not limited thereto and it is possible to select the adhesive from a variety of practically available adhesives.

Furthermore, in the above-described embodiment, the present invention is applied to the double azimuth head. However, the present invention is not limited to this case. For example, it is possible to apply the invention to the case where one magnetic head chip is mounted on the head attachment base and also to the case where a plurality of pairs of magnetic head chips are mounted on one chip attachment base.

Furthermore, in the above-described embodiment, the present invention is applied to the double azimuth head to be mounted on the rotary drum. However, the present invention is not limited thereto or thereby. For example, it is possible to apply the invention widely to a magnetic recording/playback apparatus or the like where the recording tracks are formed so as to extend in the longitudinal direction of the magnetic tape for recording digital signals.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

We claim:

1. A magnetic head in which a plurality of magnetic head chips are bonded to and held by a single chip attachment base, said magnetic head comprising the improvement wherein:

said chip attachment base holds said plurality of magnetic head chips on an attachment surface at a predetermined track pitch deviation therebetween;

at least one of said magnetic head chips faces said attachment surface and is in contact with said attachment surface along a ridge that a) is in parallel with a sliding surface of said at least one magnetic head chip, b) is located on a back surface of said at least one magnetic head chip to define a part of an outer contour of said at least one magnetic head chip, and c) serves as a fulcrum about which the head chip can be pivoted so that the track pitch deviation is adjustable; and said at least one magnetic head chip is bonded and held tilted with respect to said attachment surface with a wedge-shaped adhesive in a gap defined between said attachment surface and said at least one magnetic head chip.

2. The magnetic head according to claim 1, wherein said plurality of magnetic head chips comprise a pair of magnetic head chips with one having a positive azimuth angle and the other having a negative azimuth angle.

3. The magnetic head according to claim 2, wherein said pair of magnetic head chips are held with an adhesive at a step of 10 μm or less.

4. The magnetic head according to any one of claims 2 to 3, wherein said adhesive has a shrinkage rate of 10% or less.

* * * * *